Patented Oct. 11, 1938

2,132,846

UNITED STATES PATENT OFFICE 2,132,846

WATER-INSOLUBLE MONOAZO DYE

Miles Augustinus Dahlen, Wilmington, Del., and Martin Edwin Friedrich, Carneys Point, N. J., assignors to E. I. du Pont de Nemours & Company, Wilmington, Del., a corporation of Delaware No Drawing. Application December 17, 1935, Serial No. 54,851

2 Claims. (Cl. 260—204)

This invention relates to new compositions of matter and to dyeing. More particularly the invention relates to new compositions of matter including azo dyes, and to processes of employing them, particularly in printing processes. The invention will be described with reference to particular examples which are illustrative but not limitative thereof.

The azo dyes are a well-defined group containing the chromophor —N=N—. The chromogen of azo dyestuffs comprises two aryl radicals with the chromophor between them. The mono azo dyes are generally prepared by joining two components of which the first, an amine, is called the azo component, and the second, usually a phenol, an amine, or an active methylene compound, is called the coupling component. In coupling the components, the azo component is diazotized, and is reacted with the second component, usually in solution.

The azo dyes of the prior art are applied by one of several processes that have been devised to take advantage of the nature of particular dyes: (a) The dyestuff is dissolved or dispersed in a suitable liquid medium and the material to be dyed is dipped therein. Satisfactory results are obtained by this method only if the completed dyestuff is substantive to the material which is to be dyed. (b) A substantive coupling component, or a substantive azo component, is directly affixed to the material, and the diazotized component or the coupling component, respectively, is coupled thereto, completing the dye on the material. (c) An azo component is diazotized and coupled to a compound with which it forms a new compound stable in alkaline or neutral medium, and is mixed with the coupling component and with the other ingredients of a basic or neutral printing paste, or solution. The material to be dyed is impregnated with the paste, or with the solution, by printing or in any other satisfactory manner and the dye is formed on the material by reaction with an acid, whereby it is freed and enabled to react with the coupling component. This invention relates to new compositions of matter to be applied by the third of these methods, and to processes of applying them.

It is an object of the invention to make, use, and vend new dyestuffs: to make them by processes which are economically and technically satisfactory and to apply them to dye-susceptible materials by methods and in compositions best suited to the attaining of optimum results. Other objects of the invention will be in part apparent and in part more fully hereinafter set forth.

The objects of the invention are accomplished, generally speaking, by stabilizing a diazotized primary arylamine against reaction with a coupling component in alkaline or neutral medium and by mixing it with a compound having the formula:

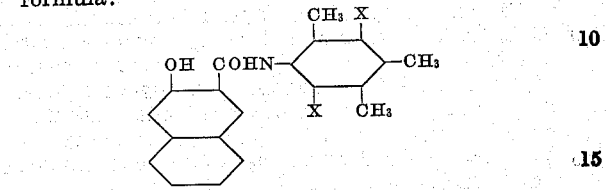

in which X is one of the group consisting of hydrogen, halogen, and alkyl. Other objects of the invention are attained by preparing the said mixtures as dry powders, as paste, or in solution, and by incorporating them in printing pastes and other dyeing compositions. The objects of the invention are accomplished, in one specific modification, by impregnating a fabric or a fibrous material with a basic or neutral paste containing a mixture of the stabilized azo component and the coupling component and exposing the impregnated material, preferably at elevated temperature, to the action of a preferably mild acid. Still other objects of the invention are accomplished by the processes of applying the new compositions of matter more fully hereinafter set forth. Another object of the invention is accomplished by dyeing a material with a dye having the formula:

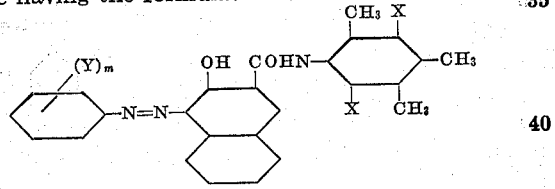

in which Y is one of a group consisting of hydrogen and an n-auxochrome, $m$ is an integer less than 6 and X is one of the group consisting of hydrogen, halogen, and alkyl. Another object of the invention is accomplished by carrying out the processes of the invention by methods which are economically and technically satisfactory.

In our copending application filed of even date herewith there is set forth a class of new compounds which we have discovered to be useful as coupling components for azo dyes.

In the practice of the invention the azo component is stabilized against reaction in alkaline or neutral medium with a coupling component either by forming the nitrosamine or a diazoimino compound thereof. The stabilized azo component will then be mixed in the form of dry powder, a paste, or a solution with the alkaline or neutral mass containing the coupling component. The details of the processes of practicing the invention will differ somewhat according to the state of the ingredients but the general method is to impregnate the colorable material with the so-formed mixture, and to act upon it with enough acid to regenerate the azo component and permit it to act upon the coupling component.

In the form of the invention which involves the dyeing of a cloth by the so-called process of printing, the azo component, diazotized and stabilized as hereinabove described, is mixed in a basic paste with the coupling component, the paste is applied to an etched or "printing" roller which impregnates the fabric by contact, the fabric is placed in a closed container, and is subjected for a few seconds, at elevated temperature and usually in the presence of water vapor, to the action of the fumes of an acid which neutralizes the basicity of the paste, breaks up the stabilized complex, and frees the azo component for reaction with the coupling component.

The azo components may advantageously include as substituents in the aryl nucleus from one to five of the group alkyl, alkoxy, halogen, aryloxy, aralkyl, aralkoxy, aryl, hydroaryloxy, and trifluoro-alkyl, which are called n-auxochromes, but generally speaking satisfactory results are obtained by the use of azo components having from one to three of these substituents. Illustrative of the general utility as azo components of the primary arylamines are the following:

Ortho-chloro-aniline
2:5-dichloro-aniline
4-chloro-2-amino-phenetol
Ortho-anisidine
4-chloro-2:5-dimethyl-aniline
4-benzoyl-amino-2:5-dimethoxy-aniline
5-nitro-2-amino-anisole
1-methoxy-2-naphthylamine
4-chloro-2-amino-diphenyl-ether
Meta-amino-benzo-trifluoride
Ortho-amino-azo-toluene
4:4'-diamino-diphenylamine
3-amino-carbazole.

Other methods of coloring dye-susceptible materials with the new dyes include the following: Textile fibers are impregnated with our new coupling components and are developed in diazo-salt solutions prepared from the diazotized arylamines hereinabove described; textile fibers may be overprinted with the paste containing the diazo-salt of an arylamine, producing the color according to the pattern of the printing roller; the new arylamides may be mixed with the diazotates (nitrosamines) derived from the diazotized arylamines useful as azo components, dye-susceptible materials may be impregnated therewith and subjected to the action of weak acids.

Any of the usual stabilizing agents may be used in the preparation of water-soluble diazoimino compounds. The following are exemplary, but not limitative, of the class:

Sarcosin
1-methyl-amino-ethane-2-sulfonic-acid
Proline
Nipecotinic-acid
Benzylene-imine-para-sulfonic-acid
1-naphthylamine-2:4:8-trisulfonic-acid
2-ethyl-amino-4-sulfo-benzoic-acid Examples of other derivatives of diazotized arylamines which are inactive toward coupling components under alkaline conditions, but which revert to the diazo form when reacted upon by acids, are for instance the so-called diazo-sulfonates, compounds which have the type formula Aryl—N=N—SO$_3$Na.

The following examples, in which parts are by weight, are designed to illustrate but not to limit the various features of the invention:

EXAMPLE I

A solution of the 2:3-hydroxy-naphthoyl derivative of 2:4:5-trimethyl-aniline was prepared as follows: 8 parts of the 2:4:5-trimethyl-anilide of 2:3-hydroxy-naphthoic-acid were pasted up with 10 parts of ethyl alcohol, 10 parts of caustic soda of 35° Bé. were admixed, and after the arylamide had dissolved completely, sufficient water was added to bring the total volume up to 1600 parts.

12 parts of ortho-dianisidine were dissolved in a mixture of 22 parts of sulfuric-acid of 66° Bé. strength and 60 parts of hot water, the solution was poured onto an excess of ice, and the tetrazotization carried out with a solution of 7 parts of sodium nitrite dissolved in 15 parts of water.

40 parts of cotton piece goods, well-boiled and dried, were impregnated with the solution of the naphthoyl derivative, the impregnated cloth was wrung out and, without drying, developed in the tetrazo solution. Just before coupling, the tetrazo solution was made slightly alkaline with sodium-bicarbonate.

The dyed cloth was rinsed, soaped at the boil, rinsed, and dried, giving a bright blue dyeing, having good fastness to light and excellent fastness to chlorine. It is represented by the formula:

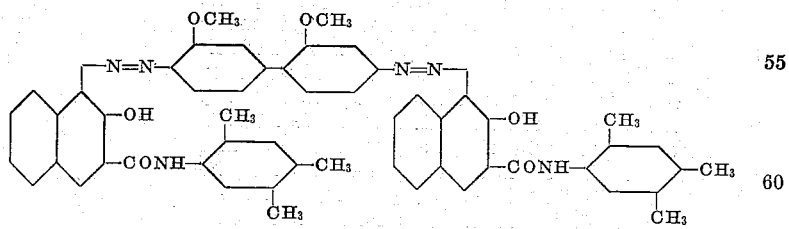

EXAMPLE II

The cloth was impregnated as in Example I and was developed in a solution prepared as follows:

14.1 parts of 4-chloro-2-amino-toluene were dissolved in 25.0 parts of hydrochloric-acid (37%) and 40 parts of water, the solution was cooled to 0-5° C., by means of external cooling, and a solution of 7 parts of sodium-nitrite dissolved in 20 parts of water was added. The temperature was held at 0-5° C. by the addition of about 50 parts of ice until diazotization was complete, the solution of the diazo salt was filtered, and its mineral acidity was neutralized by the addition of sodium-acetate.

The dyed cloth was rinsed, soaped at the boil, rinsed, and dried, giving a bright red color, having good fastness properties. The dye is represented by the formula:

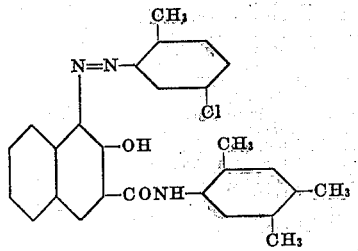

Example III

A printing paste was prepared according to the formula:

1.8 parts of the 2:3-hydroxy-naphthoyl derivative of 2:4:5-trimethyl-aniline
2.2 parts of a diazoimino compound prepared from diazotized 4-chloro-2-amino-anisole and piperidine-alpha-carboxylic acid
3.0 parts of caustic soda (40° Bé.)
65.0 parts of starch tragacanth thickener
28.0 parts of water
———
100.0

Cotton piece goods were printed with the printing paste, then developed by subjecting to the action of live steam containing the vapors of acetic-acid. In this manner the pattern was developed as a red dyeing, having very good fastness properties. The new color has the following formula:

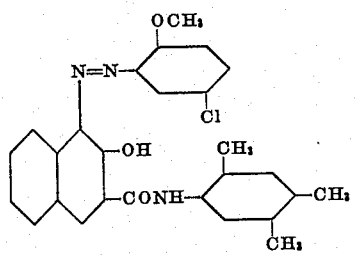

Example IV

Cotton goods were impregnated with the 2:4:5:6-tetramethyl-anilide of 2:3-hydroxy-naphthoic-acid, by the method described in Example I. The "padded" goods were developed in a diazo solution prepared as in Example II.

The dyed cloth was rinsed, soaped at the boil, rinsed, and dried. A bright red dyeing was obtained. The dye has the probable formula:

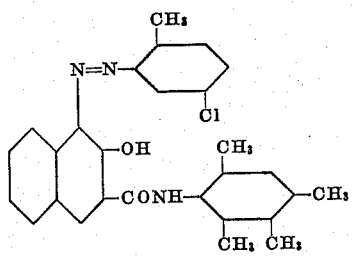

Example V

A printing paste was prepared, according to the following formula:

3.2 parts of the 2:3-hydroxy-naphthoyl derivative of 2:4:5:6-tetramethyl-aniline
2.7 parts of the dried anti-diazotate obtained from 2:5-dichloro-aniline
3.0 parts of caustic soda (40° Bé.)
65.0 parts of starch tragacanth thickener
26.1 parts of water
———
100.0

Cotton piece goods were printed with the printing paste, and developed in the usual manner in an acid ager. There was obtained an orange printing from a dye of the probable formula:

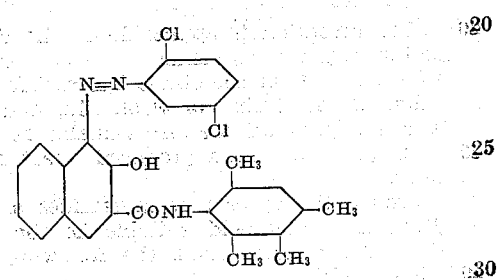

Example VI

Cotton piece goods were printed with a printing paste of the formula given in Example III, except that the 6-bromo-2:4:5-trimethyl-anilide of 2:3-hydroxy-naphthoic-acid was used as the coupling component. On treatment with live steam containing the vapors of acetic-acid, the pattern was developed in red. The new color is represented by the formula:

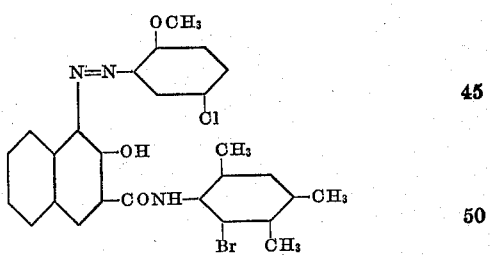

Example VII

Cotton goods were impregnated with the pentamethyl-anilide of 2:3-hydroxy-naphthoic-acid by the method described in Example I. The "padded" goods were developed in a diazo solution prepared as in Example II. The dyed cloth was rinsed, soaped at the boil, rinsed, and dried. A bright red dyeing was obtained, the dye having the probable formula:

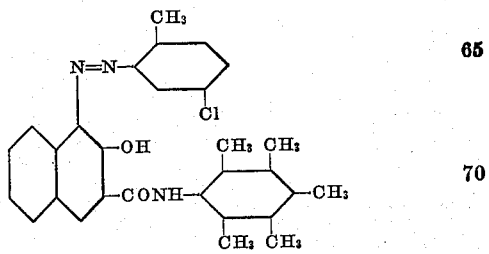

The following examples describe a variety of other colors which have been successfully produced by the use of other combinations of coupling components and diazotized arylamines.

| Example No. | Diazo component | Coupling component 2:3-hydroxy-naphthoyl | Shade |
|---|---|---|---|
| VIII | p-nitro-o-anisidine | 2:4:5-trimethyl-aniline | Scarlet. |
| IX | p-chlor-o-nitro-aniline | do | Red. |
| X | 2:5-dichlor-aniline | do | Scarlet to orange. |
| XI | 4:4'-diamino-3:3'-dimethoxy-diphenyl | do | Red blue. |
| XII | 4-benzoyl-amino-2:5-diethoxy-aniline | do | Reddish blue. |
| XIII | 4-amino-4'-ethoxy-diphenyl-amine | do | Blue. |
| XIV | 5-nitro-2-amino-anisole | do | Bordeaux. |
| XV | p-amino-diphenyl-ether | do | Scarlet. |
| XVI | p-nitro-o-anisidine | 2:4:5-trimethyl-6-brom-aniline | Pink to scarlet. |
| XVII | p-chlor-o-nitro-aniline | do | Scarlet. |
| XVIII | 2:5-dichlor-aniline | do | Orange. |
| XIX | 4:4'-diamino-3:3'-dimethoxy-diphenyl | do | Greenish blue. |
| XX | 4-benzoyl-amino-2:5-diethoxy-aniline | do | Reddish blue. |
| XXI | 4-amino-4'-ethoxy-diphenyl-amine | do | Gray blue. |
| XXII | 5-nitro-2-amino-anisole | do | Bluish red. |
| XXIII | p-amino-diphenyl-ether | do | Orange red. |

The invention is applicable to the dyeing of cotton, regenerated cellulose, cellulose esters and ethers and, with somewhat less satisfactory results, to the dyeing of wool, silk, and leather. The new products are also valuable as insoluble color pigments when produced apart from the fiber.

Among the other new arylamides of 2:3-hydroxy-naphthoic-acid, suitable for the preparation of the new colors, the following may be mentioned:

*Arylamide of 2:3-hydroxy-naphthoic-acid*

6-chloro-2:4:5-trimethyl-anilide
6-fluoro-2:4:5-trimethyl-anilide
3-chloro-2:4:5-trimethyl-anilide
3-bromo-2:4:5-trimethyl-anilide
6-ethyl-2:4:5-trimethyl-anilide
3-ethyl-2:4:5-trimethyl-anilide As many apparently widely different embodiments of this invention may be made without departing from the spirit and scope thereof, it is to be understood that we do not limit ourselves to the specific embodiments thereof except as defined in the appended claims.

We claim:
1. A dyestuff represented by the formula:

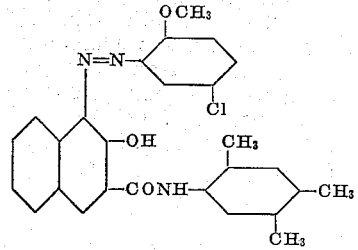

2. A fibrous material dyed with the color of claim 1.

MILES AUGUSTINUS DAHLEN.
MARTIN EDWIN FRIEDRICH.